United States Patent [19]
Dany et al.

[11] 3,931,081
[45] Jan. 6, 1976

[54] FLAMEPROOF MOULDING COMPOSITIONS BASED ON POLYOLEFINS

[75] Inventors: Franz-Josef Dany, Erftstadt Lechenich; Joachim Wortmann, Turnich; Peter Münch, Hurth-Burbach; Gunther Braun, Oberhausen; Rudolf Kern, Mainz-Weisenau, all of Germany

[73] Assignees: Hoechst Aktiengesellschaft, Frankfurt am Main; Ruhrchemie Aktiengesellschaft, Oberhausen, both of Germany

[22] Filed: June 25, 1974

[21] Appl. No.: 482,986

[30] Foreign Application Priority Data
Aug. 4, 1973 Germany............................ 2339581

[52] U.S. ..................... Cl.260/29.1 SB; 260/28.5 A; 260/33.6 PQ; 260/45.8 NT; 260/45.7 P; 260/45.9 R; 260/45.95 L
[51] Int. Cl.² ........................................... C08G 6/00
[58] Field of Search. 260/28.5 A, 33.6 PQ, 29.1 SB, 260/45.8 NT, 45.7 P, 45.9 R, 45.95 L

[56] References Cited
UNITED STATES PATENTS

| | | | |
|---|---|---|---|
| 2,452,055 | 10/1948 | Jones | 106/15 |
| 2,538,199 | 1/1951 | Jefferson | 106/15 |
| 2,603,614 | 7/1952 | Nielsen | 260/249.6 |
| 2,620,044 | 12/1952 | Fine | 106/15 |
| 2,992,201 | 7/1961 | Gober | 260/29.1 |
| 3,399,156 | 8/1968 | Bell | 260/29.1 |
| 3,666,715 | 5/1972 | Kutner | 260/45.8 |
| 3,728,294 | 4/1973 | Levine | 260/33 |
| 3,808,127 | 4/1974 | Sander et al. | 260/45.8 |
| 3,810,850 | 5/1974 | Rowton | 260/45.8 |
| 3,810,862 | 5/1974 | Mathis | 260/45.8 |
| 3,819,517 | 6/1974 | Cavazos | 106/15 |
| 3,819,575 | 6/1974 | Green | 260/45.8 |
| 3,883,475 | 5/1975 | Racky et al. | 260/45.75 |

OTHER PUBLICATIONS

Chemistry and Uses of Fire Retardants–by Lyons; 1970 pp. 36;102;256–258 and 317.
Chemistry–by Sienko; 1961 pp. 503–506.

*Primary Examiner*—V. P. Hoke
*Attorney, Agent, or Firm*—Connolly and Hutz

[57] ABSTRACT

Improved flameproof moulding compositions, which are based on polyolefins and made from a pulverulent blend comprising a polyolefin as its essential ingredient and a plurality of flame-retardant ingredients. The flame-retardant ingredients comprise red phosphorus and at least one organic nitrogen compound which carbonizes after inflammation. The moulding compositions contain the flame-retardant ingredients in a total proportion of at most about 30 weight %. Red phosphorus and organic nitrogen compound are used in a quantitative ratio between 99:1 and 1:99.

The improved moulding compositions contain as a stabilizer
- a. between about 1 and 10 weight % of amidosulfonic acid or ammonium bisulfate, based on the total quantity of the flame-retardant ingredients, or
- b. between about 5 and 15 weight % of a paraffin oil having a density between about 0.83 and 0.88 g/cc and a viscosity between about 15 and 380 centipoises, or of a mineral oil boiling within the range 170˜ and 350˜C, or of a silicon oil, based on the quantity of red phosphorus, or
- c. between about 20 and 50 weight % of pentaerythritol, based on the quantity of organic nitrogen compound.

2 Claims, No Drawings

FLAMEPROOF MOULDING COMPOSITIONS BASED ON POLYOLEFINS

The present invention relates to an improvement in, or modification of, the polyolefin-based moulding compositions described in copending, commonly assigned patent application Ser. no. 362,517, filed May 21, 1973, the contents of which are incorporated herein by reference, the improvement consisting in adding a stabilizer inhibiting the evolution of hydrogen phosphide during the thermal processing of the moulding compositions.

Patent application Ser. No. 362,517 describes flameproof moulding compositions, which are based on polyolefins and made from a pulverulent blend comprising a polyolefin as its essential ingredient and plurality of flame retardant ingredients, the said flameproof moulding compositions containing, as the flame-retardant ingredients, red phosphorous and at least one organic nitrogen compound, which carbonizes after inflammation, in a total proportion of at most about 30 weight %, the red phosphorous and the organic nitrogen compound being used in a quantitative ratio between 99:1 and 1:99.

The polyolefins, which can be rendered flameproof include high pressure and low pressure polyethylenes or polypropylene, for example.

The moulding compositions preferably contain red phosphorus and the fine particulate organic nitrogen compound in the form of particles having a size of at most 200 microns, more preferably of at most 75 microns. The organic nitrogen compound may be selected, for example, from melamine or polyacrylonitrile having a molecular weight between 15,000 and 250,000 or a chain length between 280 and 4,700.

The moulding compositions preferably contain the flame-retardant ingredients in a total proportion substantially between 10 and 30 weight %. Particularly good flameproofing effects are produced by the use of red phosphorus and organic nitrogen compound in a quantitative ratio between 70:30 to 30:70, preferably 50:50.

It is a particular advantage of the above moulding compositions that relatively minor proportions of the blend of halogen-free flame-retardant agents are needed for achieving good flameproofing effects. As a result, the mechanical and rheological properties of the plastics are substantially not affected. Certain properties, for example the ball indentation hardness, are even improved.

The blend of pulverulent flame-retardant agents is preferably incorporated mechanically into the plastics so as to ensure an optimum degree of distribution therein. Use can be made, for example, of a closable intense mixer for the homogeneous distribution of the blend of flame-retardant agents in the pulverulent plastics.

The above flameproof moulding compositions were processed under commercial conditions in an extruder at normal processing temperatures within the range of about 170° and 230°C. This gave rise to the evolution of hydrogen phosphide which has an unpleasant smell incommodating the operating personnel. The average hydrogen phosphide concentration identified just downstream of the extruder die relief was considerably above the maximum allowable value — also termed MAV-value — set to 0.1 part per million by "Kommission zur Pruefung gesundheitsschaedlicher Stoffe der Deutschen Forschungsgmeinschaft".

In accordance with the present invention, we have unexpectedly discovered that the undesirable evolution of hydrogen phosphide, which occurs on processing the moulding compositions, can be considerably diminished by incorporating certain stabilizing substances into the blend of flame-retardant agents in the moulding compositions.

The present invention provides more particularly improved flameproof moulding compositions, which are based on polyolefins and made from a pulverulent blend comprising a polyolefin as its essential ingredient and a plurality of flame-retardant ingredients, the said flameproof moulding compositions containing, as the flame-retardant ingredients, red phosphorus and at least one organic nitrogen compound, which carbonizes after inflammation, in a total proportion of at most about 30 weight %, the red phosphorus and the organic nitrogen compound being used in a quantitative ratio between 99:1 and 1:99, in accordance with patent application Ser. No. 362,517 filed May 21, 1973, the contents of which are incorporated herein by reference, the improved moulding compositions containing as a stabilizer a. between about 1 and 10 weight % of amidosulfonic acid or ammonium bisulfate, based on the total quantity of the flame-retardant ingredients, or
b. between about 5 and 15 weight % of a paraffin oil having a density between about 0.83 and 0.88 g/cc and a viscosity between about 15 and 380 centipoises, or of a mineral oil boiling at temperatures within the range about 170° and 350°C, or of a silicon oil, based on the quantity of red phosphorus, or
c. between about 20 and 50 weight % of pentaerythritol, based on the quantity of organic nitrogen compound, or a mixture of the above (a), (b) and (c) stabilizers.

In those cases in which the stabilizer is a silicon oil, it has been found advantageous to use the silicon-polyether block copolymer U 119 of Wacker-Chemie GmbH, Munchen.

The stabilizers of the present invention should preferably be incorporated with the moulding compositions by first blending the flame-retardant ingredients with the stabilizers and thereafter mixing the pulverulent plastics mechanically with the blend so made. In those cases in which a liquid stabilizer, e.g. a paraffin mineral oil or silicon oil, is used, it is good practice to only mix the stabilizer with red phosphorus and absorb it therein, whereby the red phosphorus is desensitized. Following this, a blend of desensitized red phosphorus and organic nitrogen compound and further stabilizers, if desired, is incorporated into the pulverulent plastics.

By the addition of the present stabilizers to the moulding compositions, it is possible for them to be processed mechanically at elevated temperatures substantially without any significant evolution of hydrogen phosphide injurious to the health of the operating personnel.

The following Example and Table illustrate the efficiency of the stabilizers of the present invention.

EXAMPLE 17 specimens of low-pressure polyethylene, which was rendered flameproof by means of pulverulent red phosphorus and melamine and polyacrylonitrile, respectively, and stabilized with different proportions of the present stabilizers, were prepared in a series of tests. To this end, the pulverulent plastics, flame-retardant ingredient and stabilizer were intimately blended together in an intense mixer and the resulting blend was extruded through a small extruder provided with a short compression screw. In those cases in which a liquid stabilizer, e.g. a paraffin oil, mineral oil or silicon oil, was used, it was first blended with red phosphorus and the resulting blend was then delivered to the intense mixer. The compression screw of the extruder rotated at a speed of 80 rpm, at a cylinder inlet temperature between 160° and 190°C, and a die temperature of 190°C. The moulding composition issued from the die relief in the form of a filament which was reduced to granules. To determine the hydrogen phosphide evolved during the extrusion, a glass funnel was placed just downstream of the die relief in such a manner that the funnel's open side faced the die relief. Hydrogen phosphide which was evolved during the extrusion was collected in the funnel and removed through a conduit opening into the funnel. By means of a gas detector, model 21/31 (a product of Draeger company, Luebeck) and with the use of a little pipe for the selective determination of hydrogen phosphide (a product of Draeger company, Luebeck), the $PH_3$-concentration was identified in the funnel just above the clie relief. This was indicated by a color change in a coloration zone within the pipe. The $PH_3$-concentration is directly readable on a scale printed on the pipe. The results obtained in each particular case are indicated in the Table hereinafter.

| | |
|---|---|
| PE | = Parts by weight of low pressure polyethylene; melt index ($i_5$): 19.6; density: 0.965 g/cubic centimeter. |
| P | = Parts by weight of particulate red phosphorus with a size of at most 100 microns. |
| M | = Parts by weight of particulate melamine with a size of at most 100 microns. |
| PAN | = Parts by weight of polyacrylonitrile with a molecular weight of 150,000 or a chain length of 2,800. |
| S | = Parts by weight of stabilizer |
| $PH_3$ | = Hydrogen phosphide concentration in parts per million |
| Column $B_1$ | = Burn-up length until self-extinction in mm. |
| Column $B_2$ | = Burn-up time until self-extinction in seconds |
| Column C | = Non-flammability of test tape (+). |

The stabilizers listed in column S of the Table have the following properties:

Paraffin oil: density 0.88 g/cc; viscosity up to 18°C: 380 centipoises
Mineral oil: boiling range between 280° and 350°C.
Silicon oil: water-soluble silicon-polyether block copolymer U 119 of Wacker-Chemie GmbH, Munich; density (25°C) 1.04 g/cc; viscosity at 20°C =, 1 100 centipoises.

To demonstrate the stabilizer efficiency, specimens 1 and 13 were kept free from stabilizer. As results from the Table, by the addition of the stabilizers of the present invention to the moulding compositions, it is possible to reduce the evolution of $PH_3$ considerably during extrusion substantially without any significant modification of their behaviour in the burn-up test.

Table 1

| Specimen No. | PE | P | M | PAN | S | $PH_3$ | Burn-up test(ASTM D 635-68) | | |
|---|---|---|---|---|---|---|---|---|---|
| | | | | | | | $B_1$ | $B_2$ | C |
| 1 | 90 | 5 | 5 | — | — | 2.4 | — | — | + |
| 2 | 90 | 5 | 4.9 | — | 0.1 (NH$_4$)HSO$_4$ | 0.3 | — | — | + |
| 3 | 90 | 5 | 4.8 | — | 0.2 " | 0.1 | — | — | + |
| 4 | 90 | 5 | 4.9 | — | 0.1 SO$_3$H.NH$_2$ | 0.5 | — | — | + |
| 5 | 90 | 5 | 4.8 | — | 0.2 " | 0.3 | — | — | + |
| 6 | 90 | 5 | 3.5 | — | 1.5 pentaerythritol | 0.2 | — | — | + |
| 7 | 90 | 5 | 2.5 | — | 2.5 " | 0.1 | — | — | + |
| 8 | 90 | 5 | 4.5 | — | 0.5 Paraffin oil | 0.2 | 3 | 38 | — |
| 9 | 90 | 5 | 4.5 | — | 0.5 Mineral oil | 0.3 | 5 | 56 | — |
| 10 | 90 | 5 | 4.5 | — | 0.5 Silicon oil | 0.3 | 4 | 45 | — |
| 11 | 90 | 5 | 4.3 | — | {0.2 (NH$_4$)HSO$_4$ / 0.5 Paraffin oil} | <0.05 | 2 | 24 | — |
| 12 | 90 | 5 | 4.3 | — | {0.2 SO$_3$H.NH$_2$ / 0.5 Paraffin oil} | <0.05 | 2 | 28 | — |
| 13 | 90 | 5 | — | 5 | — | 1.6 | 7 | 75 | — |
| 14 | 90 | 5 | — | 4.8 | 0.2 SO$_3$H.NH$_2$ | 0.3 | 8 | 83 | — |
| 15 | 90 | 5 | — | 2.5 | 2.5 Pentaerythritol | 0.1 | 8 | 78 | — |
| 16 | 90 | 5 | — | 4.5 | 0.5 Paraffin oil | 0.15 | 10 | 101 | — |
| 17 | 90 | 5 | — | 4.3 | {0.2 SO$_3$H.NH$_2$ / 0.5 Paraffin oil} | <0.05 | 9 | 87 | — |

The flammability of the flame-retardant moulding compositions was tested on test tapes 1.28 cm wide and 4 mm thick, made from the individual specimens. They were cut out from compressed sheets. The sheets were made by compressing the granulated polyethylene in a steam-heated hydraulic press at 180°C under a pressure of 50 kg/sqcm.

The burn-up tests were made in accordance with ASTM-D 635-68. The results obtained are indicated in the following Table 1, wherein the various abbreviations have the following meanings.

We claim:
1. Improved flameproof moulding composition, comprising a pulverulent blend of a polyolefin and a plurality of flame retardants consisting of, in addition to red phosphorus, at least one organic nitrogen compound, selected from the group consisting of melamine and polyacrylonitrile, the amount of flame retardants being about 10–30 weight % of said composition, the quantitative ratio of red phosphorus and the organic nitrogen compound being 30:70–70:30, the improved moulding composition containing as a stabilizer
   a. between about 1 and 10 weight % of amidosulfonic acid or ammonium bisulfate, based on the total quantity of the flame-retardant, or b. between about 5 and 15 weight % of a paraffin oil having a density between about 0.83 and 0.88 g/cc and a viscosity between about 15 and 380 centipoises, or of a mineral oil boiling within the range 170 and 35°C, or of a silicon oil, based on the quantity of red phosphorus, or c. between about 20 and 50 weight % of pentaery-thritol, based on the quantity of organic nitrogen compound, or d. mixtures of (a) and (b).

2. The moulding composition as claimed in claim 1, containing a mixture of the (a) and (b) stabilizers in a ratio of 2:5.

* * * * *

UNITED STATES PATENT AND TRADEMARK OFFICE
CERTIFICATE OF CORRECTION

PATENT NO. : 3,931,081
DATED : JANUARY 6, 1976
INVENTOR(S) : FRANZ-JOSEF DANY ET AL

It is certified that error appears in the above–identified patent and that said Letters Patent are hereby corrected as shown below:

Column 5 line 5 change "35°C" to --350°C--.

Column 3 line 28 change "clie" to --die--.

Signed and Sealed this fifteenth Day of June 1976

[SEAL]

Attest:

RUTH C. MASON
Attesting Officer

C. MARSHALL DANN
Commissioner of Patents and Trademarks